United States Patent [19]

Matsumoto et al.

[11] 4,336,547

[45] Jun. 22, 1982

[54] PUMP SYNCHRONIZATION IN AN INK JET SYSTEM PRINTER

[75] Inventors: Masafumi Matsumoto; Matahira Kotani, both of Nara; Hiromu Sasaki, Yamatokoriyama, all of Japan

[73] Assignee: Sharp Kabushiki Kaisha, Osaka, Japan

[21] Appl. No.: 186,349

[22] Filed: Sep. 11, 1980

[30] Foreign Application Priority Data

Sep. 28, 1979 [JP] Japan ............................... 54-125793

[51] Int. Cl.[3] ........................ B41J 27/00; G01D 15/02

[52] U.S. Cl. .................................. 346/75; 346/140 R

[58] Field of Search .................. 346/140 R, 140 IJ, 75

[56] References Cited

U.S. PATENT DOCUMENTS 3,346,869 10/1967 Stone ............................ 346/140 IJ
3,371,350 2/1968 Sanderson et al. ............ 346/140 R
3,893,623 7/1975 Toupin ............................ 346/75 X

FOREIGN PATENT DOCUMENTS 2828998 1/1980 Fed. Rep. of Germany ........ 346/75

*Primary Examiner*—Donald A. Griffin
*Attorney, Agent, or Firm*—Birch, Stewart, Kolasch & Birch

[57] ABSTRACT

An ink jet system printer of the charge amplitude controlling type includes a reciprocating printer head and a constant flow rate plunger pump. An actual printing operation is conducted while the printer head is driven to travel forward, and the constant flow rate plunger pump is energized to develop the ink liquid when the printer head is driven to travel backward. A pressure accumulator of a small capacity is disposed between the constant flow rate plunger pump and the printer head for minimizing the pressure pulsation created by the constant flow rate plunger pump.

6 Claims, 13 Drawing Figures

PUMP SYNCHRONIZATION IN AN INK JET SYSTEM PRINTER

BACKGROUND AND SUMMARY OF THE INVENTION

The present invention relates to an ink liquid supply system for an ink jet system printer of the charge amplitude controlling type wherein a printer head is driven to reciprocate across the printing region.

In the conventional ink jet system printer of the charge amplitude controlling type, a constant pressure ink liquid supply pump is employed, wherein the mass of the ink droplets and the velocity of the ink droplets emitted from a nozzle are variable depending on the ink characteristics such as the viscosity. These variations will provide a distortion on the printed character. Recently it has been proposed to employ a constant flow rate ink liquid supply pump in order to compensate for the ambience temperature variation. A typical constant flow rate pump and operation modes thereof are described in copending application Ser. No. 70,639 (DOS 2,934,947), now U.S. Pat. No. 4,278,984 issued July 14, 1981, entitled, "CONSTANT FLOW RATE LIQUID SUPPLY PUMP", filed on Aug. 28, 1979 by Masafumi Matsumoto and Matahira Kotani and assigned to the same assignee as the present application, or Ser. No. 97,389 (DOS No. 2,948,131), now U.S. Pat. No. 4,263,602 issued Apr. 21, 1981, entitled "CONSTANT FLOW RATE LIQUID SUPPLY PUMP", filed on Nov. 26, 1979 by Masafumi Matsumoto and Matahira Kotani and assigned to the same assignee as the present application.

However, the above-mentioned constant flow rate ink liquid supply pump cannot ensure stable ink droplet formation when the ambience temperature is rapidly changed. Moreover, the stable ink droplet formation is not expected when the last printing operation is terminated at, for example, 40° C. and the present printing operation is initiated at, for example, 5° C. This is mainly caused by a pressure accumulator which is required for removing the pressure pulsation. When the pressure accumulator has a small capacity, the pressure pulsation cannot be removed. When the pressure accumulator has a large capacity, the system cannot respond to the rapid temperature variation.

Accordingly, an object of the present invention is to provide a novel ink liquid supply system in an ink jet system printer of the charge amplitude controlling type which has a reciprocating printer head.

Another object of the present invention is to provide an ink liquid supply system including a constant flow rate liquid supply pump and a small capacity pressure accumulator.

Still another object of the present invention is to provide a control system for correlating the pump drive with the printer head movement in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an ink liquid supply system includes a constant flow rate ink liquid supply pump and a pressure accumulator of a small capacity for removing the pressure pulsation created by the constant flow rate ink liquid supply pump. The drive timing of the constant flow rate ink liquid supply pump is synchronized with the drive timing of a printer head which is driven to reciprocate across the printing region. More specifically, the initiation of the driving of the constant flow rate ink liquid supply pump is effected when the printer head is located at a position not effective for the actual printing, for examples, the left-most home position of the printer head.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
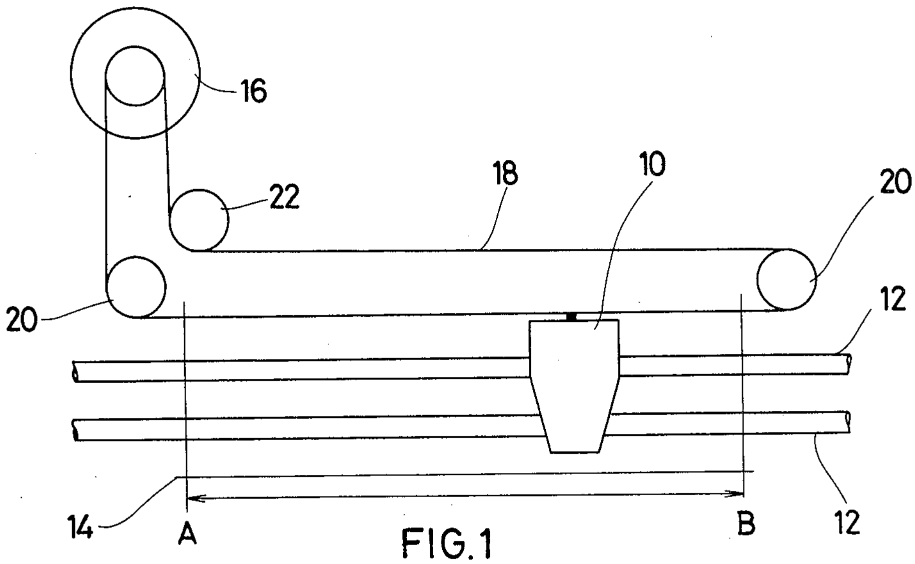
FIG. 1 is a schematic plan view of a printer head drive mechanism of an ink jet system printer of the charge amplitude controlling type.

FIG. 1 schematically shows a printer head drive mechanism in an ink jet system printer of the charge amplitude controlling type.

A printer head 10 is slidably mounted on guide rails 12, and driven to travel along a print receiving paper 14. A drive mechanism comprises a pulse motor 16 (or a DC servomotor) and a drive wire 18 (or a belt) extended between pulleys 20, a tension pulley 22 and the pulse motor 16. The drive wire 18 is fixed to the printer head 10 at a desired position, thereby reciprocating the printer head 10 across a print region AB by forwardly or reversely rotating the pulse motor 16 (or the DC servomotor).

Figure 2:
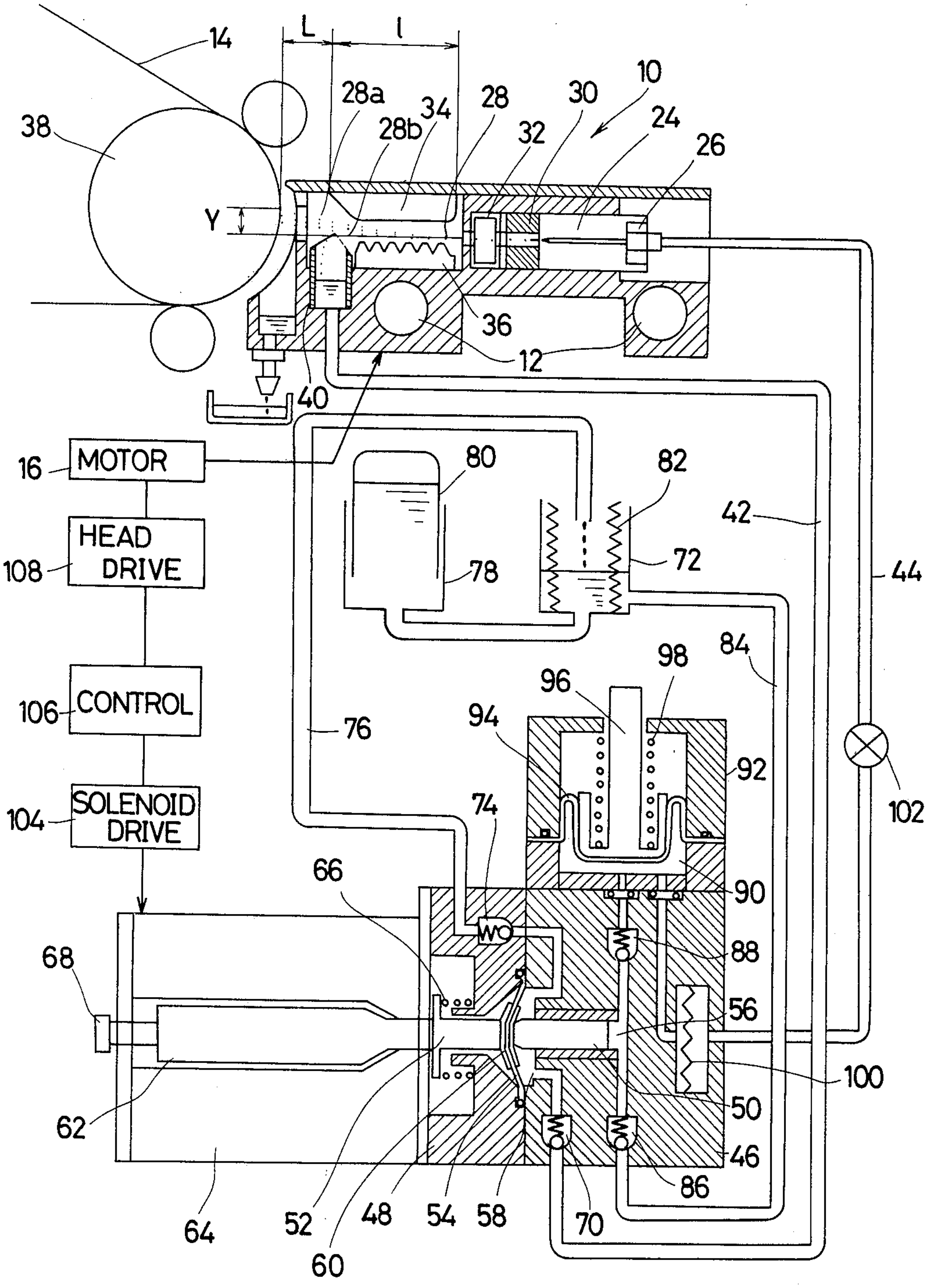
FIG. 2 is a schematic block diagram of an embodiment of an ink jet system printer of the present invention.

FIG. 2 schematically shows an embodiment of the printer head 10 and an ink liquid supply system of the present invention.

The printer head 10 comprises a nozzle 24 for emitting an ink liquid supplied from the ink liquid supply system. An electromechanical transducer 26 is attached to the nozzle 24 to vibrate the nozzle 24 at a given frequency, thereby forming ink droplets 28 at the given frequency. The thus formed ink droplets 28 are selectively charged through the use of a charging tunnel 30 in accordance with a print information signal. A sensing electrode 32 is disposed in front of the charging tunnel 30 to detect whether the ink droplets 28 are accurately charged. An output signal of the sensing electrode 32 is used for synchronizing the application of the charging signal to the charging tunnel 30 with the droplet formation rhythm as is well known in the art.

The thus charged ink droplets 28 are deflected while they pass through a constant high voltage electric field established by a pair of deflection electrodes 34 and 36 in accordance with charge amplitudes carried thereon. Deflected ink droplets 28*a* are directed to the record receiving paper 14 which is supported by a platen 38. Ink droplets 28*b* not contributing to the actual printing operation are not charged and they are directed to a beam gutter 40 for recirculation purposes.

The above-mentioned nozzle 24, the electromechanical transducer 26, the charging tunnel 30, the sensing electrode 32, the deflection electrodes 34 and 36, and the beam gutter 40 are incorporated in the printer head 10 which is slidably mounted on the guide rails 12. The deflection caused by the deflection electrodes 34 and 36 is effected in the vertical direction, and the printer head 10 is driven to travel in the lateral direction, whereby desired patterns are formed on the record receiving paper 14 in the dot matrix fashion.

The ink liquid collected by the beam gutter 40 is returned to the ink liquid supply system through a conduit 42. The thus returned ink liquid is introduced into a constant flow rate pump, which regulates the ink liquid at a fixed flow rate to be fed to the nozzle 24 through a conduit 44. The constant flow rate ink liquid is strictly required to ensure accurate printing and stabilize the droplet formation.

The constant flow rate pump mainly comprises two coaxial cylinder blocks 46 and 48, two coaxial pistons 50 and 52, and a diaphragm 54 interposed between the pistons 50 and 52. A first pressure chamber 56 is defined by the cylinder block 46 and the piston 50. A second pressure chamber 58 is defined by the cylinder block 46, the piston 50, and the diaphragm 54. Pressure in the chambers 56 and 58 is varied in response to the reciprocating movement of the coaxial pistons 50 and 52, and the diaphragm 54.

More specifically, the diaphragm 54 is supported by a reinforcing member 60, and secured to the piston 52 through the use of the piston 50 and the reinforcing member 60. The periphery of the diaphragm 54 is fixed between the cylinder blocks 46 and 48. When the piston 52 is driven to reciprocate, the diaphragm 54 and the piston 50 are moved in unison with the movement of the piston 52.

The piston 52 is connected to a plunger 62 which is associated with a DC solenoid 64. The DC solenoid 64 creates the rightward movement of the piston 52. A spring 66 is disposed between the cylinder block 48 and a flange portion of the piston 52 to provide the leftward movement of the piston 52. An adjusting screw 68 is provided for adjusting the stroke length of the plunger 62. That is, the adjusting screw 68 is used for adjusting the flow rate of the ink liquid developed from the constant flow rate pump. The flow rate can alternatively be modified by changing the frequency of an activating signal to be applied to the DC solenoid. The second pressure chamber 58 is communicated to the conduit 42 via an inlet valve 70 in order to introduce the ink liquid collected by the beam putter 40. The thus introduced ink liquid is returned to a recovering tank 72 through an outlet valve 74 and a conduit 76. The recovering tank 72 stores the collected, returned ink liquid and a fresh ink liquid supplied from an ink liquid reservoir 78 including an ink liquid cartridge 80. A filter 82 is disposed in the recovering tank 72. The ink liquid stored in the recovering tank 72 is supplied to the first pressure chamber 56 through a conduit 84 and an inlet valve 86.

An outlet valve 88 is provided for the first pressure chamber 56 to develop an ink liquid of a constant flow rate toward a pressure accumulator 90. The pressure accumulator 90 comprises a cylinder 92, a resilient member 94, for example, a bellows or a diaphragm, a cap 96, and a spring 98. The periphery of the resilient member 94 is secured to the cylinder 92, and the resilient member 94 is biased downward through the use of the spring 98 and the cap 96. The pressure accumulator 90 functions to absorb the pressure pulsation. The ink liquid of a constant flow rate, which does not include pulsation, derived from the pressure accumulator 90 is supplied to the nozzle 24 through a filter 100, an electromagnetic valve 102, and the conduit 44.

When the plunger 62 is driven to travel rightward by the DC solenoid 64, the pistons 52 and 50 and the diaphragm 54 travel rightward. The plunger activation is controlled by a solenoid driver 104 which is controlled by a control system 106.

At this moment, the pressure in the first pressure chamber 56 is increased, whereby the ball valve in the outlet valve 88 is pushed upward against the spring to develop the ink liquid toward the pressure accumulator 90. At the same time, the pressure in the second pressure chamber 58 is also increased, and the ball valve in the outlet valve 74 is pushed leftward in FIG. 2 against the spring to develop the ink liquid toward the recovering tank 72 through the conduit 76.

When the plunger 62 has been shifted right by a predetermined length, the DC solenoid 64 is deenergized. Then, the pistons 52 and 50, and the plunger 62 are moved leftward due to the retaining strength of the spring 66 till the plunger 62 contacts the tip end of the adjusting screw 68.

While the pistons 52 and 50, and the diaphragm 54 travel leftward, a negative pressure is created in the first pressure chamber 56, whereby the ball valve in the inlet valve 86 is pushed upward against the spring to introduce the ink liquid from the recovering tank 72 through the conduit 84. The ink liquid amount introduced from the recovering tank 72 and supplied to the nozzle 24 is determined by the shift length of the piston 50 and its reciprocating frequency. At the same time, the negative pressure is also created in the second pressure chamber 58, whereby the ball valve in the inlet valve 70 is pushed upward against the spring to introduce the waste ink liquid collected by the beam gutter 40 through the conduit 42.

The above-mentioned operation is repeated to supply the ink liquid at a constant flow rate to the nozzle 24, and to effectively recover the ink liquid not contributing to the actual printing operation.

As already discussed above, the pressure accumulator 90 is provided for removing the pressure pulsation created by the constant flow rate pump. The capacity of the pressure accumulator 90 greatly influences the remaining strength of the pressure pulsation and the transient characteristics when the ink liquid pressure changes. When the capacity of the pressure accumulator 90 is selected to be considerably large, the pressure pulsation can be satisfactorily removed, but the response time becomes considerably long. That is, the ink liquid supply system will never return to a normal operation mode in a short time when the ambience temperature suddenly changes.

Figure 5:
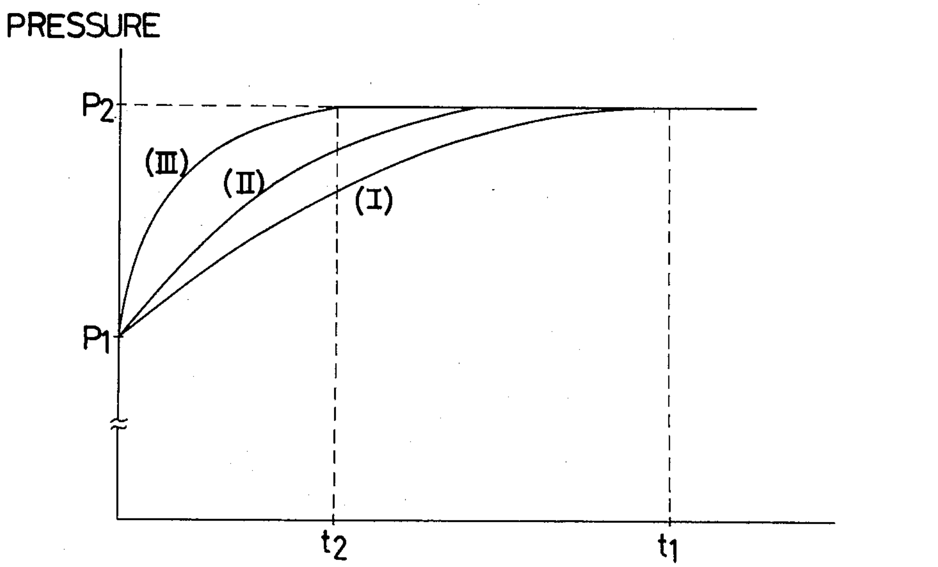
FIG. 5 is a graph showing operation characteristics of an ink liquid supply system included in the ink jet system printer of FIG. 2.

FIG. 5 shows pressure versus response time characteristics of an ink liquid supply system employing the pressure accumulator 90. When the pressure accumulator 90 has a large capacity (shown by a curve I), a considerably long period is required for changing the ink liquid pressure from $P_1$ to $P_2$. If the pressure accumulator 90 of a small capacity (shown by a curve III) is employed, only a short period is required for changing the ink liquid pressure from $P_1$ to $P_2$.

The present invention is to provide an ink liquid supply system which employs the pressure accumulator 90 of small capacity. To eliminate the print distortion caused by the pressure pulsation, a printer head driver 108 is controlled by the control system 106 in such a manner that the plunger activation is synchronized with the printer head drive.

Deflection amount y of the ink droplet 28*a* can be expressed as follows when the air resistance is neglected.

$$y = \frac{qEl}{mv^2}\left(\frac{l}{2} + L\right)$$

where:

m is mass of the ink droplet 28*a;*
v is the velocity of the ink droplet 28*a;*
q is the charge amount of the ink droplet 28*a;*
E is the strength of the deflection electric field;
l is the length of the deflection electrode 34 as shown in FIG. 2; and
L is the distance between the print receiving paper 14 and the deflection electrode 34 as shown in FIG. 2.

Figure 3:
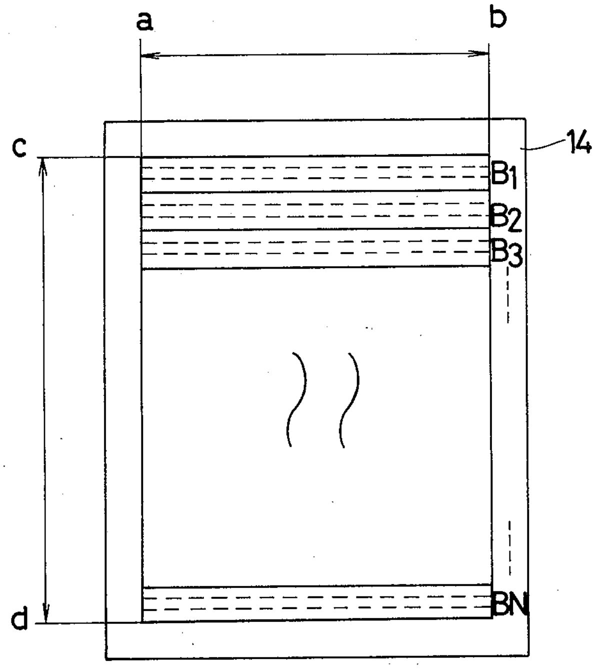
FIG. 3 is a plan view of an example of a print format carried out by the ink jet system printer of FIG. 2.

The deflection amount y must be held constant to ensure a clean printing. When the ink jet system printer of the charge amplitude controlling type is used as a recorder in a facsimile system, three rows are usually printed at the same time as shown in FIG. 3. If the deflection amount becomes small, there will be produced an undersirable clearance between print bands $B_1, B_2, \ldots, B_N$. If the deflection amount becomes large, the ink droplets may overlap each other at the boundary between the print bands $B_1, B_2, \ldots, B_N$.

In the above-mentioned equation, the deflection electric field E, the length l and the distance L can be maintained stationary without regard to the variation of the ambience condition. However, the mass m, the velocity v and the charge amount q are difficult to hold stationary when the ambience condition varies.

Figure 4:
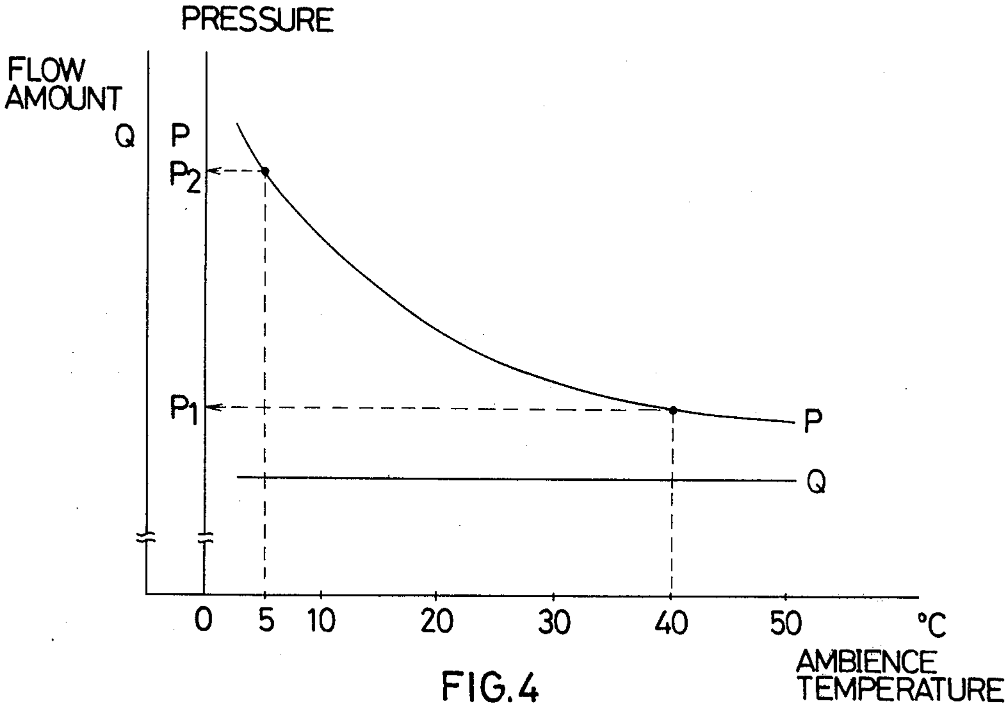
FIG. 4 is a graph showing operation characteristics of a constant flow rate pump included in the ink jet system printer of FIG. 2.

The constant flow rate ink liquid supply pump employed in the present ink liquid supply system functions to vary the pressure in the pressure accumulator 90 when the viscosity of the ink liquid is varied due to temperature variations, whereby the flow rate Q is held stationary. FIG. 4 shows pressure versus ambience temperature characteristics and flow rate versus ambience temperature characteristics of the constant flow rate pump. Accordingly, if the constant flow rate pump is employed, the above discussed mass m, velocity v and charge amount q can be held substantially stationary even when the ambient temperature varies.

However, the constant flow rate characteristics cannot be expected when, for example, the last printing operation is terminated at a temperature 40° C. and a pressure $P_1$, and the present printing operation is initiated at a temperature 5° C. A predetermined time period is required for changing the pressure to a normal pressure $P_2$. Until the pressure reaches the normal pressure $P_2$, the flow amount becomes smaller than the constant value, and therefore, the deflection amount y becomes larger than a predetermined value. As already discussed above, the predetermined time period required for changing the pressure to the normal pressure $P_2$ can be minimized when the pressure accumulator 90 has a small capacity.

Figure 6:
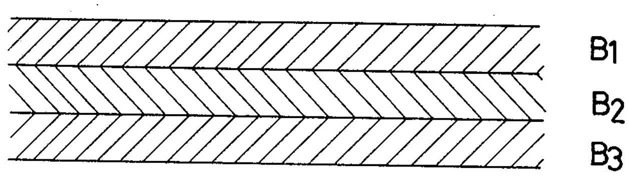
FIGS. 6(A), 6(B) and 6(C) are charts showing examples of actual print-out produced by the ink jet system printer of FIG. 2.
Figure 6:
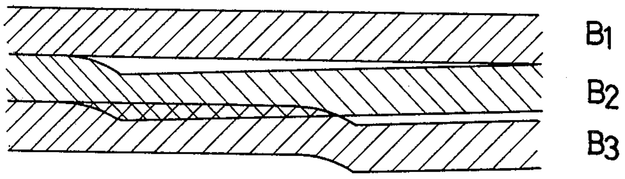
Figure 6:
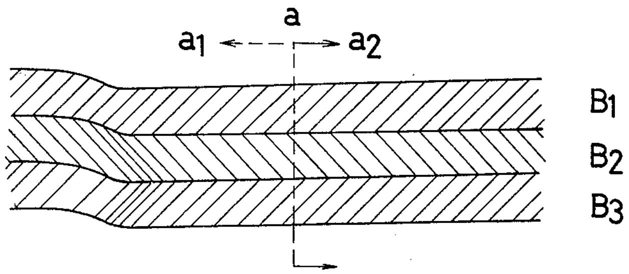

Our experience revealed that a clean printing can be ensured when the pressure pulsation (ripple) is held smaller than 1.5%. FIG. 6(A) shows a print-out sample where the pressure pulsation is held at zero. FIG. 6(B) shows a distorted print-out sample where a considerable pressure pulsation remains. However, if the distorted portion is controlled to occur at a predetermined position, the actual print-out can be made clean as shown in FIG. 6(C).

The present invention is to minimize the above-mentioned time period required for reaching the normal operation pressure. The pressure accumulator 90 does not have a large capacity. Accordingly, the print distortion caused by the pressure pulsation cannot be neglected, but a control system is provided to locate the distorted portion at a predetermined position on the actual print-out, thereby making clean the actual print-out.

Operation modes of the ink jet system printer of the present invention will be described, in detail, with reference to FIGS. 7(A) through 7(E).

Figures 7A, 7B, 7C, 7D, 7E:
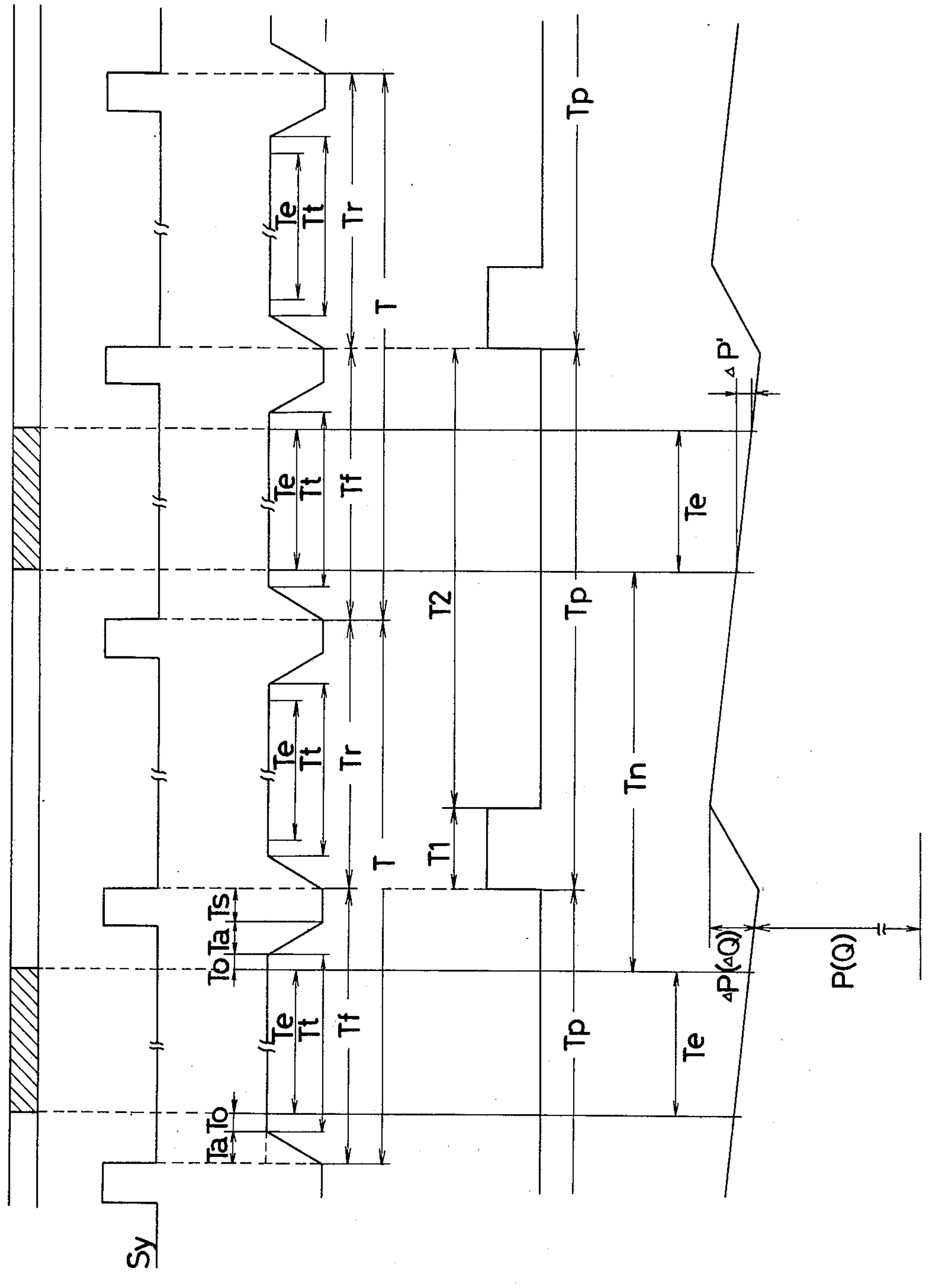
FIGS. 7(A) through 7(E) are time charts for explaining an operation mode of the ink jet system printer of FIG. 2.

When a drive synchronization signal $S_y$ (shown in FIG. 7(B)) is applied from the control system 106 to the printer head driver 108, an acceleration command is applied to the pulse motor 16. The pulse motor 16 is gradually accelerated forward through the use of a slewing frequency signal during a period of time $T_a$. When the pulse motor 16 reaches a preselected rotating velocity, the constant speed rotation is maintained for a period of time $T_t$ as shown in FIG. 7(C). Thereafter, the slewing frequency signal is applied to the pulse motor 16 to gradually decelerate the rotation during a period $T_a$. The pulse motor 16 is held stationary for a period $T_S$, thereby completing the forward drive operation ($T_f$). At the trailing edge of the next appearing drive synchronization signal $S_y$, the pulse motor 16 initiates the reverse drive operation ($T_r$). In this way, one cycle reciprocation is completed to conduct one band printing. The above-mentioned operation is repeated to conduct the printing for the print bands $B_1, B_2, \ldots, B_N$.

FIG. 7(A) shows the print timing. The actual printing operation is conducted at a period shown by the hatched portion. That is, the actual printing operation is conducted while the printer head is driven to travel forward at the constant speed. FIG. 7(D) shows a solenoid activation signal developed from the solenoid driver 104. The solenoid 64 is energized at a period of time $T_1$ which is initiated at the trailing edge of the drive synchronization signal $S_y$ for performing the reverse rotation of the pulse motor 16. That is, the first pressure chamber 56 of the constant flow rate pump conducts the liquid developing operation while the printer head is driven to travel backward during which the actual printing operation is not conducted. More specifically, the first pressure chamber 56 develops the ink liquid toward the nozzle 24 at the period $T_1$, and introduces the ink liquid from the recovering tank 72 at a period $T_2$. FIG. 7(E) shows an ink liquid pressure developed from the pressure accumulator 90 and applied to the nozzle 24. The constant flow rate pump creates the pressure pulsation $\Delta P(\Delta Q)$ around 6%. However, in the actual printing period $T_e$, the pressure pulsation $\Delta P'$ is below 1.5%. Therefore, a clean printing is expected. In FIG. 6(C), the actual printing is conducted at a section $a_2$, and the actual printing is not conducted at a section $a_1$.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer comprising:
- a printer head for emitting ink droplets;
- a print receiving member for receiving the ink droplets emitted from said printer head;
- head drive means for reciprocating said printer head with respect to said print receiving member;
- ink liquid supply means for supplying ink liquid to said printer head, said ink liquid supply means including a constant flow rate plunger pump and a pressure accumulator disposed between said flow rate pump and said printer head;
- pump drive means for activating said constant flow rate pump comprising a solenoid for activating said plunger pump; and
- synchronization means for developing a synchronization signal in order to synchronize the operation of the pump drive means with the operation of the head drive means so as to establish printing and non-printing periods, such that, during the actual printing period, the plunger pump is not driven to operate and said ink liquid supply is conducted through the use of the pressurized ink liquid contained in said pressure accumulator, while, during the non-printing period, said plunger pump is driven to increase the ink liquid pressure in said pressure accumulator.

2. The ink jet system printer of claim 1, wherein the actual printing operation is conducted while said printer head is driven to travel forward.

3. The ink jet system printer of claim 1, wherein said synchronization means develops a control signal for energizing said solenoid while said printer head is driven to travel backward at which time the actual printing operation is not conducted.

4. The ink jet system printer of claim 1, 2, or 3, wherein said printer head further comprises:
- a nozzle for emitting the ink liquid supplied from said ink liquid supply means;
- an electromechanical transducer for vibrating said nozzle at a given frequency, thereby forming the ink droplets at said given frequency;
- a charging tunnel for selectively charging said ink droplets in accordance with a print information signal; and
- a pair of deflection electrodes for establishing a constant high voltage electric field, said charged ink droplets being deflected in accordance with the charge amount carried thereon while they pass through said high voltage electric field.

5. The ink jet system printer of claim 4, said printer head further including a beam gutter for collecting the ink droplets not charged by said charging tunnel and not contributing to the actual printing operation.

6. The ink jet system printer of claim 1, wherein the capacity of said pressure accumulator is small.

* * * * *